United States Patent [19]

Lipton

[11] Patent Number: 4,562,463
[45] Date of Patent: Dec. 31, 1985

[54] STEREOSCOPIC TELEVISION SYSTEM WITH FIELD STORAGE FOR SEQUENTIAL DISPLAY OF RIGHT AND LEFT IMAGES

[75] Inventor: Lenny Lipton, Point Richmond, Calif.

[73] Assignee: Stereographics Corp., San Rafael, Calif.

[21] Appl. No.: 263,944

[22] Filed: May 15, 1981

[51] Int. Cl.[4] .......................... H04N 9/54; H04N 9/60
[52] U.S. Cl. ........................................ 358/88; 358/91; 358/92
[58] Field of Search ..................... 358/11, 3, 88, 91, 92, 358/134, 133, 222, 225, 227; 250/313, 314; 350/427, 132; 352/63

[56] References Cited

U.S. PATENT DOCUMENTS

| | | | |
|---|---|---|---|
| 2,417,446 | 3/1947 | Reynolds | 358/92 |
| 3,049,588 | 8/1962 | Barnett | 358/88 |
| 3,076,054 | 1/1963 | Simon | 358/88 |
| 3,621,127 | 11/1971 | Hope | 352/63 |
| 3,674,921 | 7/1972 | Goldsmith | 358/91 |
| 3,737,567 | 6/1973 | Kratomi | 358/92 |
| 3,941,921 | 3/1976 | Yumde et al. | 358/134 |
| 3,991,266 | 11/1970 | Baer | 358/92 |
| 4,266,240 | 5/1981 | Levy | 358/88 |
| 4,286,286 | 8/1981 | Jurisson et al. | 358/92 |
| 4,287,528 | 9/1981 | Levy | 358/88 |
| 4,424,529 | 1/1984 | Roese et al. | 358/92 |

FOREIGN PATENT DOCUMENTS 1187473 2/1965 Fed. Rep. of Germany ...... 358/222

OTHER PUBLICATIONS

Charman–Three-Dimensional TV System–Applied Optics, vol. 20, #1, Jan. 1981, pp. 14–16.
Dummling et al., Stereoscopic Television and Stereoscopic Cinematography with Modern X-Ray Units—Electromedica (Germany) 1975, pp. 35–39.

Primary Examiner—Joseph A. Orsino, Jr.
Attorney, Agent, or Firm—J. William Wigert, Jr.

[57] ABSTRACT

A stereoscopic television system comprising single or double camera designs adapted to televise twin perspective points of view, which are the source for encoding alternate odd and even fields with right and left images, and a television receiver for displaying such images with either passive or infra-red signaled or internally clock controlled active selection devices. The receiver and the preferred embodiment of the camera use field storage devices to record and playback picture information in an appropriate sequence in such a manner to eliminate flicker and to overcome spurious temporal parallax effects. The receiver uses monochromatic or color television tubes, like those of present manufacture, but employs means to double the scan rate so that, for example, an effective 60 fields for each eye for domestic receivers, and 50 fields for each eye, for certain foreign receivers, is achieved. Field storage or buffer circuits allow the doubling of the number of fields without doubling of the bandwidth. The receiver incorporates circuits for charging and synchronizing the phase of electro-optical shutters in individual selection devices of the active kind, or for activating an electro-optical material overlayed on the CRT which can rotate polarization in synchronization with right and left image fields to operate in conjunction with polarized selection devices of the passive kind.

9 Claims, 15 Drawing Figures

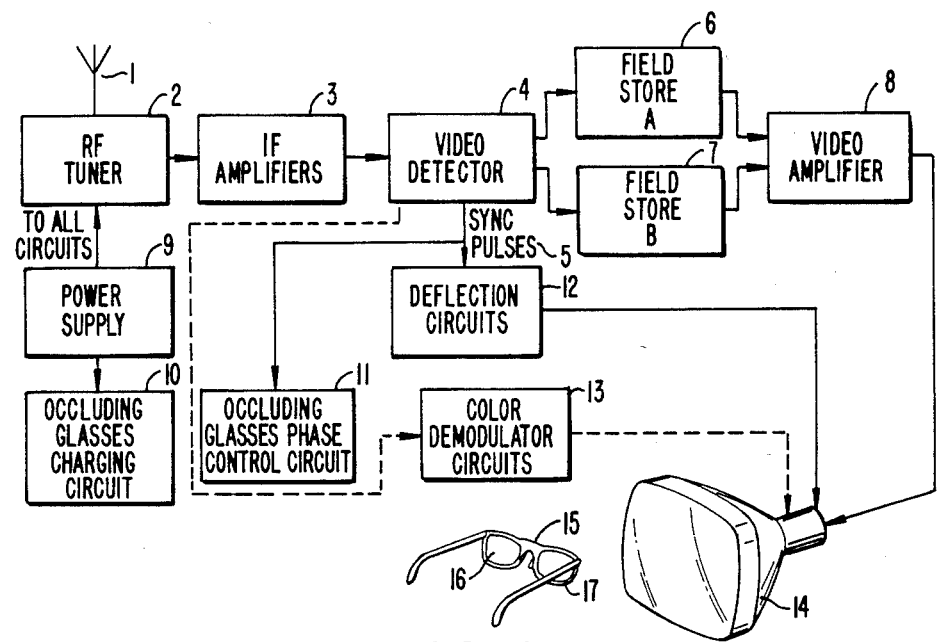
FIG._1.
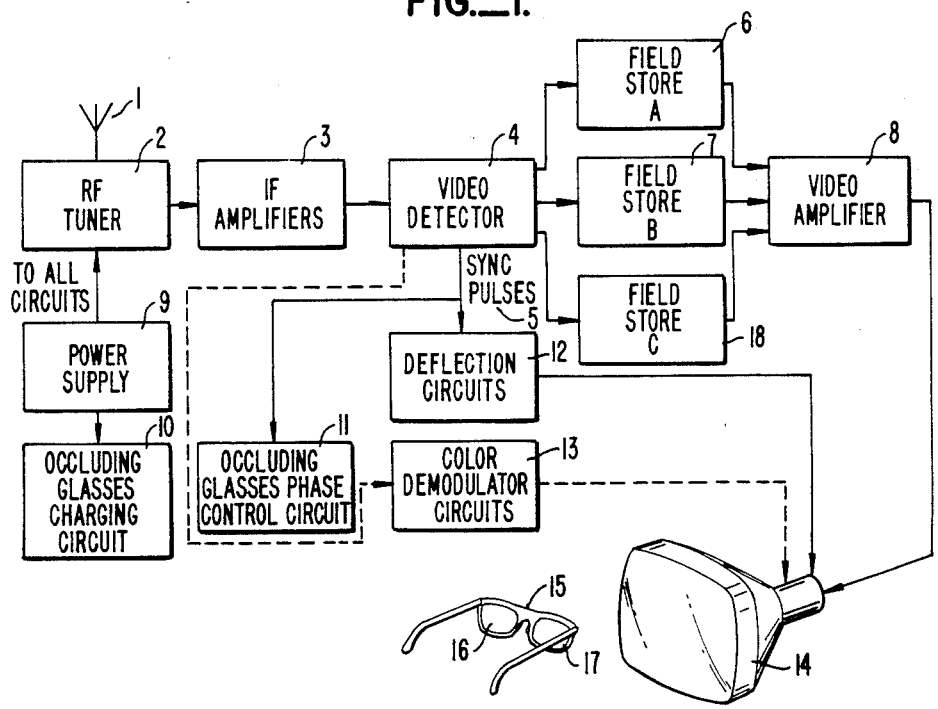
FIG._2.

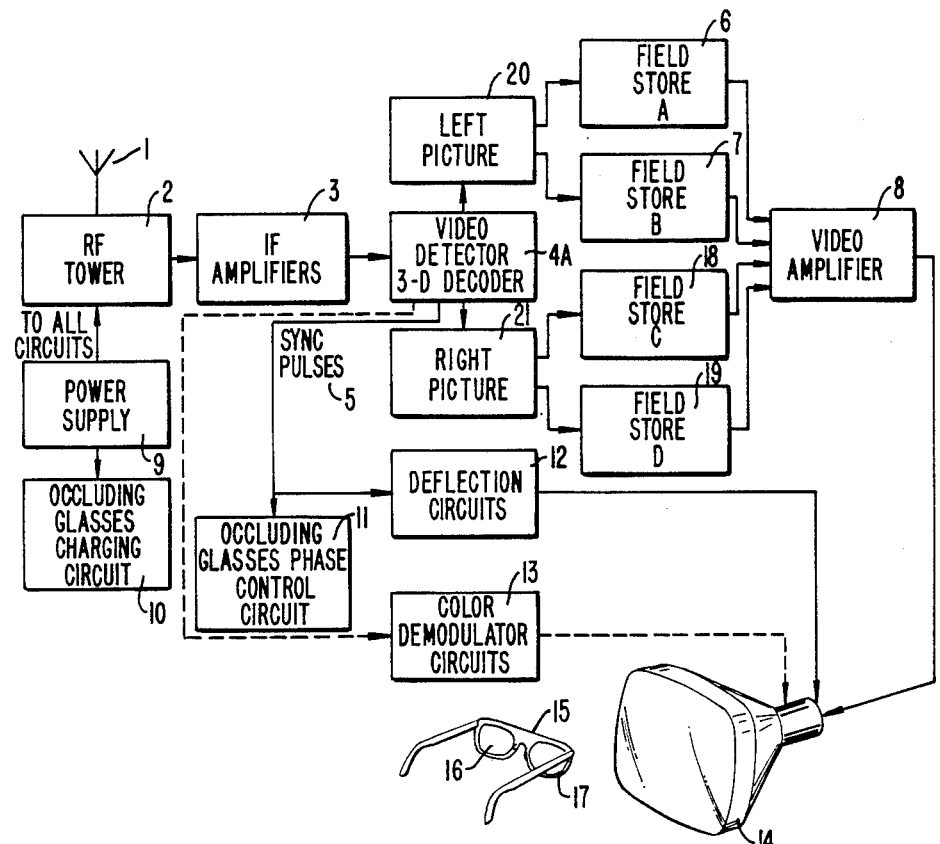
FIG._3.
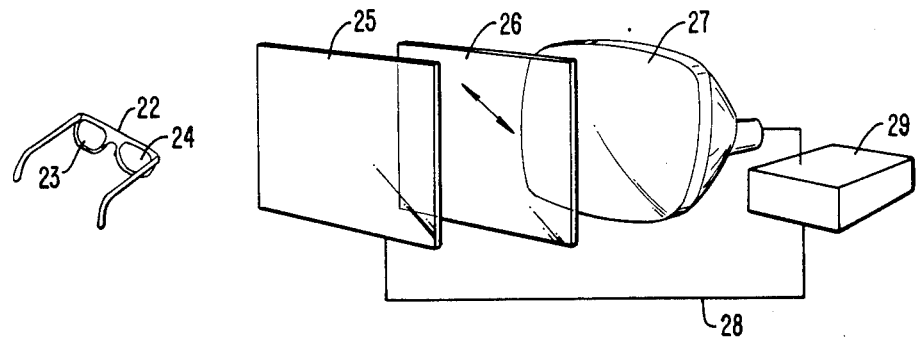
FIG._4.

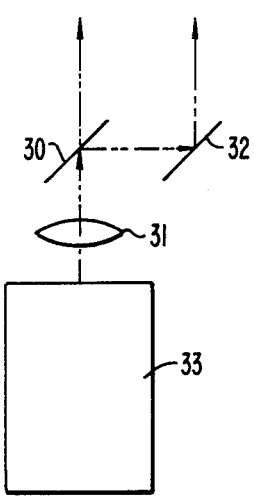
FIG._5.
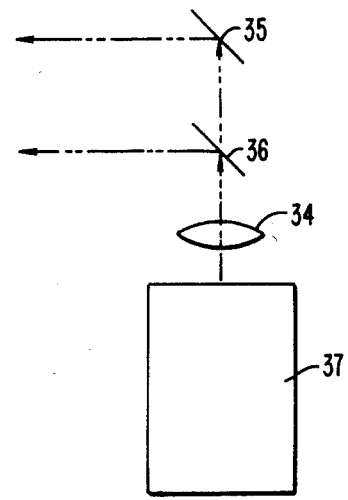
FIG._6.
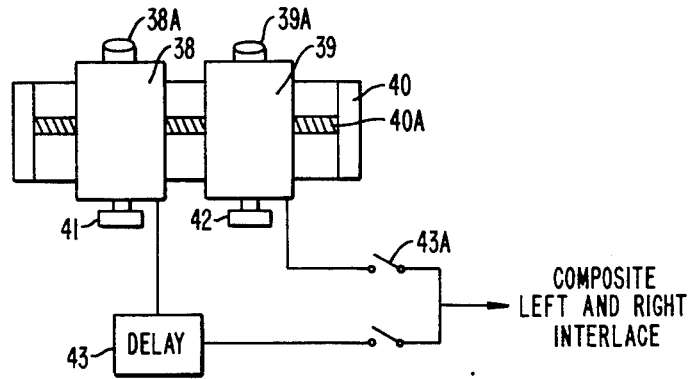
FIG._7A.
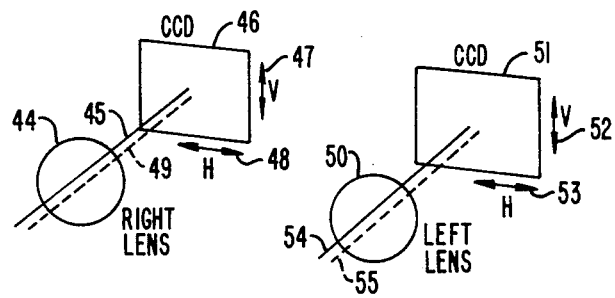
FIG._7B.

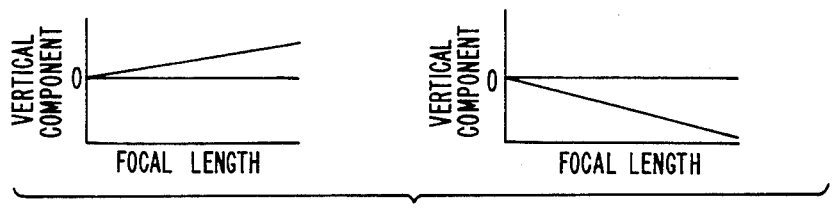
FIG._7C.
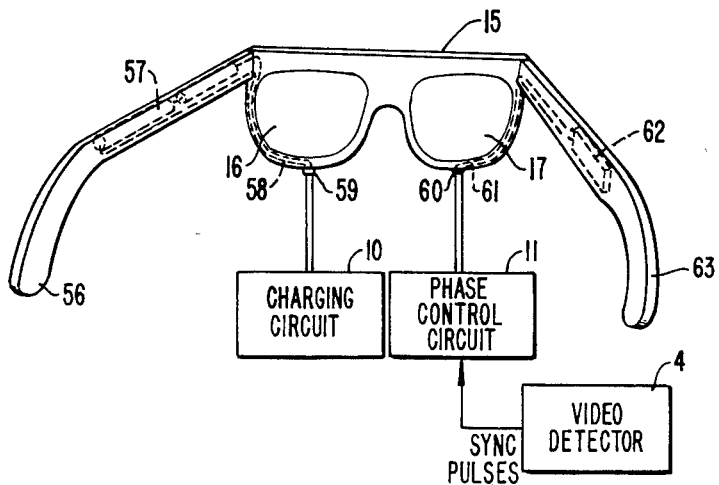
FIG._8.
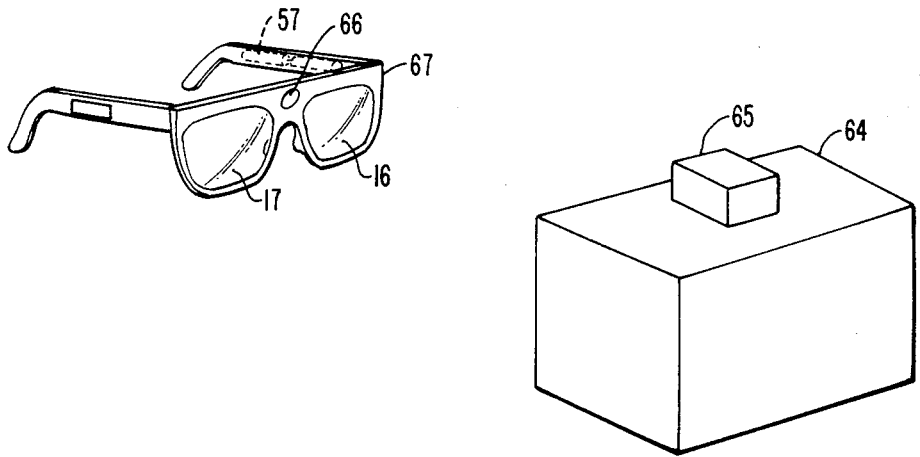
FIG._9.

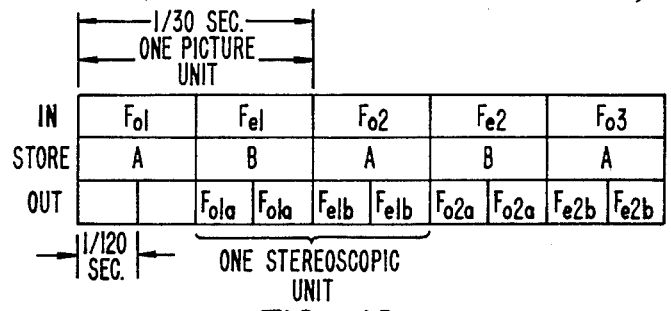
FIG.—10.
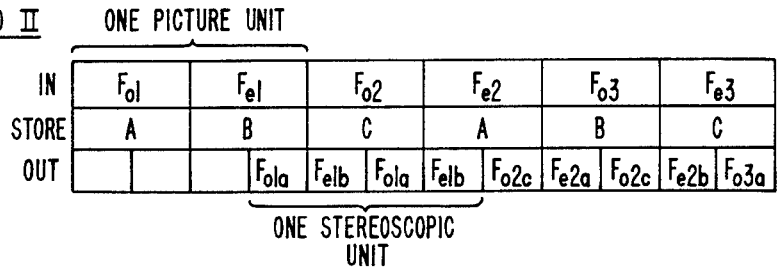
FIG.—11.
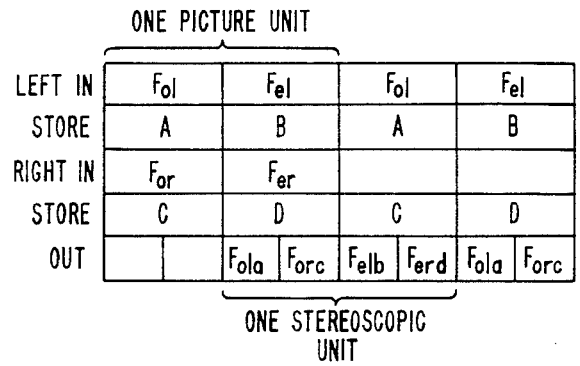
FIG.—12.
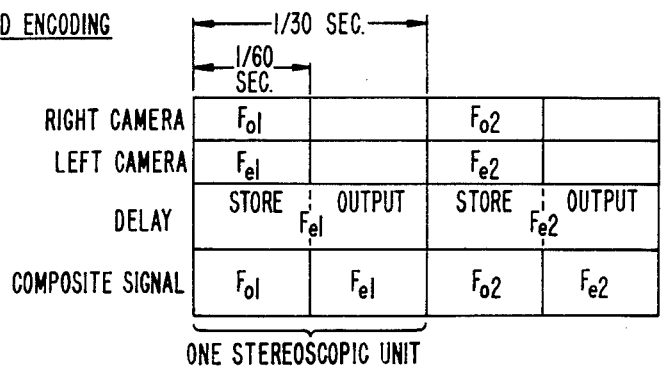
FIG.—13.

STEREOSCOPIC TELEVISION SYSTEM WITH FIELD STORAGE FOR SEQUENTIAL DISPLAY OF RIGHT AND LEFT IMAGES

BACKGROUND OF THE INVENTION

1. Field

This invention relates to stereoscopic imaging systems. More specifically, this invention discloses an improved stereoscopic television system which has a great degree of compatability with the existing commercial television infrastructure. Compared with prior art systems using sequential display of right and left picture information, it eliminates flicker and spurious temporal parallax effects, while having greatly increased brightness.

In the following description of the prior art, I describe and identify an effect which I have discovered, known as "spurious temporal parallax," which has led me to the disclosure of this invention. Specifically, where left and right images are taken out of time phase or spaced a predetermined distance apart (such as 0.008 seconds), a temporal dislocation of the spatial orientation of objects can occur. Such spurious effects arise because objects will move some finite distance in the time interval between the right and left shutter or scanning operation. This will produce unwanted motion and consequent depth reception in the respective image field. The brain in turn interprets this as stereoscopic information since it is turned into parallax information. The reader will understand that insofar as novelty herein is set forth, I specifically claim as a part of my invention the discovery of this effect as it relates to the problem of stereoscopic television transmission and reception. The identification of this problem as it relates to stereoscopic television leads to my solution. It goes without saying that the identification and proper statement of the problem to be solved oft times is the equivalent of invention.

2. State of the Art

Various means have been proposed for stereoscopic television systems. Whatever their virtues the technology is most deficient in image display. A number of inventions, such as U.S. Pat. Nos. 3,184,630 (Geer), 3,674,921 (Goldsmith) and 4,214,257 (Yamauchi) have suggested autostereoscopic means using interdigitized stereopairs. By juxtaposing lenticular elements in front of the CRT phosphur screen, with appropriately placed vertical image stripes of interdigitized stereopairs, it is hoped that successful selection of the left and right images may take place at the surface of the screen. However, as is well known in the art, this type of parallax stereogram display results in relatively narrow viewing zones, plus unwanted pseudoscopic zones, which require careful placement of the eyes in a particular stereoscopic zone. This results in restrictions in the number of viewers and on viewer head movement which may possibly find uses in certain limited applications, but such systems are very imperfect manifestations of the art.

One possible approach illustrated by U.S. Pat. No. 4,062,045 (Iwane), is to increase the number of image channels in an attempt to broaden the stereoscopic viewing zones. But such a technique would entail increasing the transmission bandwidth and lead to complications in camera design and in design of a suitable CRT. Such a panoramagram television system would require many, perhaps dozens of channels, to overcome viewer eye placement restrictions.

A more practical approach is to use two picture channels for transmission of a conventional stereopair to be viewed with individual selection devices. Such art has been well travelled but the method of display remains a serious challenge to the ingenuity of the inventor. For economic reasons it would be good to depart as little as possible from the CRT designs commercially available, but many workers have advocated various special types of tubes or viewing systems. Designers are faced with the fact that the rear screen projected image of the familiar CRT picture tube uses electrons, not light, and electrons cannot be encoded with polarization information. Therefore, attempts must be made to polarize or encode the image after it has been formed by the CRT. U.S. Pat. No. 3,858,001 (Bonne) uses an electro-optical device in front of the surface of the screen to alter the axis of polarization of light in synchronization with incoming alternate left and right image fields. U.S. Pat. No. 4,122,484 (Tan) suggests using features of rear and front screen displays employing a CRT combined with a front projection scheme.

These two ideas illustrate prior art concerns and approaches. In one case (Bonne), left and right images are displayed alternately, with appropriate polarization characteristics added at the surface of the screen in synchronization with alternate image fields. In another case (Tan), a CRT has its image encoded with a sheet polarizer which is superimposed with a video projected image of light orthogonally polarized with respect to the CRT image.

Other designers have used special tube designs to steer the image elements to the appropriate position on the face of the CRT in order to place those elements in proper juxtaposition with sheet polarizers. U.S. Pat. No. 2,783,406 (Vanderhooft) shows such a tube using internal vertical masking to steer the image, similar to designs used for color tubes. (This particular embodiment is shown applied to an interdigitized parallax stereogram but would apply as well to alignment of vertical image elements with strips of sheet polarizers.)

Another approach, which has been revived by the introduction of electro-optical shuttering devices, is the eclipse method of image selection. In the eclipse method right and left shutters alternately occlude the unwanted image and transmit the wanted image.

U.S. Pat. No. 1,435,520 (Hammond) shows such a mechanical shuttering system for motion picture work and others, like U.S. Pat. No. 2,810,318 (Dockhorn) similar mechano-optical systems for television, but mechano-optical occluding devices are bulky and cumbersome. One major disadvantage of all occlusion systems is that left and right stereoscopic moving images must be photographed or televised and presented essentially simultaneously. Jones and Schurclif, writing in the Journal of the S.M.P.T.E. (1954, Vol. 62 p. 134) point out that shutter phase for motion picture projection must be to within 100 degrees (or 0.01 second) of the 360 degrees of the intermittent cycle. My investigations bear this out, and the shutter synchronization for photography must be to even closer tolerances, of about 10 degrees (or 0.0008 seconds) for fast moving subject.

With the occulsion system proposed by all prior television art, spurious temporal effects are to be expected since left and right images are taken and presented completely out of phase, or 0.02 seconds apart. Such spurious effects arise because objects will move some finite distance in the time interval between right and left shutter or scanning operation, and this will produce unwanted motion of the right with respect to the left image field. This is interpreted as stereoscopic information since it is turned into parallax information.

In the modern occluding systems electro-optical shutters replace mechano-optical shutters. This is typified by U.S. Pat. No. 3,821,466 (Roese), where alternate fields are used to encode right and left image pairs. This use of alternate fields has a long tradition in the prior art. For example, U.S. Pat. No. 2,578,298 (Goldsmith) proposes such a system. In addition to the aforementioned spurious temporal parallax difficulties, which is described by many viewers as "a kind of unsharpness," such alternate interlace schemes reduce the number of images reaching each eye by half, and create an even more serious problem; image flicker. A flickering image is never desirable in any imaging system, but alternating right and left images carried by odd and even fields will reduce the total number of fields perceived by each eye to well below the critical fusion frequency (CFF). This CFF cannot be specified with a single number since it varies with image brightness, portion of the retina receiving the image, and other factors. However, the number of images for television and motion picture applications is generally set at from 48 to 72 per second for flickerless display.

In addition, existing electro-optical shuttering glasses have low transmittance leading to exceedingly dim images which necessitate viewing the screen in a darkened room.

Prior art such as U.S. Pat. Nos. 3,737,567 (Kratomi) and 3,821,466 (Roese) commonly specified conventional twisted nematic liquid crystal devices but their defect, namely slow decay time, produced cross talk of left through right image and vice versa. Replacing liquid crystal with faster responding ferroelectric lead zirconate-titante ceramic material (PLZT) solved the ghosting problem, but left the display with a rather dim image, since the PLZT material, like the conventional liquid crystal material has a relatively low transmittance.

Field storage figures prominently in my disclosure, therefore it will be worthwhile to review what suggestions have been made vis-a-vis three-dimensional television. In the DOTS (digital optical technology system) as reported in *IEEE Spectrum* (N. Mokhoff, February 1981) buffers are used to store fields and to compare two stored fields in order to extract a color difference signal to produce a synthetic stereoscopic effect. Although a conventional television may receive such a transmission, complimentary colored glasses must be used as is the case in anaglyph systems. This prevents display of true color images and leads to eyestrain in many viewers.

U.S. Pat. No. 4,214,267 (Roese et al.) teaches that field stores may be used to hold stereofluoroscopic images. The purpose is to hold still images so that they may be displayed conveniently, and a magnetic disc system is advocated.

Zammit and Swegle (Applied Optics, Vol. 18, No. 5, Mar. 1, 1979) discuss a helmet stereoscope display unit worn by the viewer, with CRT's built into it, one for each eye. They advocate using the right-left scheme of alternate odd-even fields well known in the art in order to preserve present bandwidth requirements. They are aware that reducing the number of fields to each eye by half will produce flicker, and they suggest an electronic analogue delay line might be used to show each frame twice on each CRT. Following up this work, Charman (Applied Optics, Vol. 20, No. 1, Jan. 1, 1981) suggests the use of occluding spectacles and a single screen, but he feels that an electronic analog delay line is not necessary since his experiments have suggested that the level of flicker was acceptable because binocular stimulation with images 180° out of phase leads to a reduction in the CFF. Charman was using the 50 Hz British system, in which each eye would have received 25 pictures per second. This observation runs counter to mine in which 30 television fields per second seemed to me to be entirely unacceptable in such a display system because resultant flicker is terribly annoying.

SUMMARY OF THE INVENTION

The present invention is similar to prior art employing electro-optical techniques for taking and display of sequentially presented right and left image pairs, with certain important and unique differences. While the nature of the interlace is exploited to encode right and left picture information on respective odd and even fields, the invention seeks to increase the presently employed scanning rate of the display while maintaining the present broadcase bandwidth. For example, the incoming 60 fields per second of picture information (30 right and 30 left) may be turned into a total of 120 fields per second (60 right and 60 left) and displayed by the CRT or solid state display in a specifiably controlled sequence to eliminate flicker and spurious temporal parallax.

Field storage or buffer devices, well known in video and computer technology and commercially available in many embodiments, are employed to record each incoming field, and to playback the field to be displayed by the CRT or solid state display in the specifiable sequence necessary to eliminate flicker and spurious temporal parallax. In the preferred variation, right and left (or odd and even) fields are displayed right-left-right-left, to make up one complete stereoscopic picture unit, and in another variation the following scheme is employed: right-right-left-left.

Field storage or delay is also employed in the dual camera design shown in FIG. 7A in order to transmit right and left images taken simultaneously but transmitted sequentially.

While the total amount of picture information is the same as that which would be present in the usual system of television interlace, the total number of fields is effectively doubled through the use of image storage means and by scanning the fields of the CRT or solid state display at twice normal rate.

Thus the normal bandwidth characteristics of transmission or recording are preserved, while an effective doubling of bandwidth with regard to interlace rate is achieved by means of signal processing in the receiver. All aspects of the existing television infrastructure, as well as existing methods for cable and through-the-air transmission, as well as recording and playback by magnetic tape and disc media, are maintained.

Selection devices or spectacles employing electro-optical shutters using surface mode liquid crystal or similar high transmittance material are employed. These have sufficiently rapid response and decay time to satisfy needed requirements with regard to synchronization with the right and left image fields. Moreover, these surface mode liquid crystal shutters have some two to three times the transmittance as prior art PLZT ceramic material. Electroptic shutters which are able to occlude light directly rather than by rotating its polarization can be used when devices with suitably rapid switching are available. This will increase available brightness by a factor of 2 or more. In addition these spectacles are self-powered using rechargeable cells, and synchronized with regard to occlusion with respect to field presentation by means of an internal electronic clock, or by means of infra-red signals transmitted by the receiver and detected by a sensor within the spectacles.

In another variation of the invention a surface mode liquid crystal device in juxtaposition with a sheet polarizer is used at the surface of the CRT to rotate polarization of image light in sequence with the appropriately encoded left or right image field. Individual viewing devices with sheet polarizer filters are used.

Additional features of the invention relate to the use of the field storage technique in conjunction with so-called compatible systems to display the right and left image alternately on CRT's of conventional design.

Further features of the system are methods for using single tube ensemble or semi-conductor imaging device video cameras for stereoscopic videography, and double camera ensemble or CCD video cameras to photograph right and left perspective points of view. The double camera takes right (odd) and left (even) fields simultaneously, in order to eliminate spurious temporal parallax. One of the fields is delayed and held for the duration of a single field, and then released so that right and left fields, although taken at the same moment, are transmitted sequentially. Thus the images of one camera are always treated on a delay basis in order to eliminate spurious temporal parallax, while the two perspective viewpoints are transmitted in sequence to satisfy the nature of the television interlace system. Novel methods for the setting of convergence and correction of recentration of zoom optics are also revealed, for the dual camera design.

STATEMENT OF OBJECTS OF INVENTION

Accordingly it is an object of this invention to provide an improved stereoscopic television system with a bright and flickerless display.

A further object of this invention is to provide a stereoscopic television receiver or monitor which is similar to existing receiver apparatus with regard to substantial portions of existing electronic systems and display tubes.

Another object of this invention is to provide a television system which may be used for closed circuit industrial and similar applications employing a monitor with a bright and flickerless image.

A still further object of this invention is to provide a stereoscopic television system which is highly compatible with the existing commercial television broadcast system.

Yet another object of this invention is to provide stereoscopic encoding using existing or future video disc and video tape formats without modification.

Another object of this invention is to provide a stereoscopic television system which may be broadcast over a single existing cable channel.

Still another object of this invention is to provide a stereoscopic television system capable of being broadcast through the air within present bandwidth requirements.

Another object of this invention is to provide for field storage or delay for one-half of a dual stereoscopic television camera rig, so that right and left image pairs may be taken simultaneously, with right and left fields in synchronization, whence these pairs are transmitted alternately in sequence as odd-even fields of the standard interlace system.

Yet another object of the present invention is to encode right and left image pairs on successive odd and even fields and to store these incoming fields in the receiver or monitor in field buffers and to display more than the number of incoming fields, typically twice, in the same unit of time at which they were incoming by typically doubling the scanning rate of the CRT, or similar display device.

A further object of the present invention is to decode so-called compatible stereoscopic signals which have been broadcast by encoding left and right difference signals on a portion of the waveform and to store these signals in a suitable field buffer system and to display these fields in appropriate sequence at twice the incoming field rate to eliminate flicker and spurious temporal parallax effects.

Another object of this invention is to increase or double the existing field rate of the CRT or similar display device in order to effectively increase or double the picture rate for each eye and to thereby eliminate flicker by raising the number of pictures per eye above the critical fusion frequency threshold.

Another object of this invention is to increase or double the existing field rate at the CRT or similar display device and to store and release incoming fields in the appropriate sequence so as to eliminate spurious temporal parallax effects which are a cause of viewer discomfort.

Still another object of the present invention is to use surface mode liquid crystal devices as electro-optical shuttering elements in individual selection devices.

And another object of the present invention is to employ surface mode liquid crystal devices at the surface of the CRT or similar display device in conjunction with a sheet polarizer in order to effectively rotate the plane of polarization of linearly polarized light transmitted from the surface of the CRT or other display device, so that passive selection devices using sheet polarizers may be employed.

A further object of the present invention is to provide a display device suitable for three-dimensional computer graphics.

A further object of the present invention is to provide a television display for use with video games.

Yet another object of the present invention is to greatly increase the transmittance of electro-optical shutters employed in passive or active systems.

Still another object of the present invention is to provide stereoscopic cameras which have single pickup tube ensembles or CCD devices and mirror surfaces for depicting two perspective points of view with the ability to vary the parameters of convergence and interaxial setting.

And another object of the present invention is to provide a stereoscopic television receiver or monitor which may playback conventional planar transmissions with no modifications.

Still another object of the present invention is to provide active selection devices with rechargeable power supply without either cables or wireless means for synchronization information for the occluding elements. Rather, the synchronization between shutter elements and TV fields is maintained by means of an internal clock within the spectacles.

And another object of the present invention is to provide active selection devices with rechargeable power supply without cables for synchronization information for the occluding elements. Rather, the synchronization between shutter elements and TV fields is established by means of transmitted infra-red pulses.

Another object of the present invention is to disclose a unique method for setting the convergence of a twin lens ensemble television camera, typically employing a CCD or similar solid state pick up device.

Still another object of the present invention is to provide unique means for the control of recentration of zoom lens optics in twin lens camera ensembles employing CCD or similar solid state pick up devices.

Still another object is to enable multiple viewers to see entirely or partially different programs on a single CRT or solid state screen. For example one person could play a videogame while another watched a movie. Headphones would separate the audio—or three pilots could watch three different sets of images on a signal display screen. In this case three different monoscopic images at 40 Herz could be presented and both eyes would be shuttered simultaneously.

BRIEF DESCRIPTION OF THE DRAWINGS

FIG. 1 shows a diagrammatic presentation of the major components comprising a television receiver and selection devices for viewing the display employing method one sequence for output interlace.

FIG. 2 shows a diagrammatic presentation of the major components comprising a television receiver and selection devices for viewing the display employing method two sequence for output.

FIG. 3 shows a diagrammatic presentation of the major components comprising a television receiver and selection device for viewing the display employing decoding of so-called compatible signals displayed in accordance with the invention.

FIG. 4 shows a stereoscopic display with sequential polarization at the surface of the display device and passive selection devices.

FIGS. 5 and 6 show an embodiment of the present invention wherein only one TV camera is used instead of two TV cameras.

FIG. 7A shows a top view of a stereoscopic zoom camera disclosed in the copending patent application No. 6,261,302 now U.S. Pat. No. 4,418,993.

FIG. 7B shows a schematic view of methods for convergence setting of said camera and also for correction of recentration.

FIG. 7C gives the plots for vertical and horizontal components of recentration as a function of focal length for a typical zoom lens.

FIG. 8 shows a schematic representation of an active selection device employing electro-optical occluding elements, rechargeable power cells, and an internal clock for synchronizing occlusion with fields.

FIG. 9 shows a schematic representation of an active selection device employing electrooptical occluding elements, rechargeable power cells, and an infra-red sensor for receiving synchronization information from the receiver or monitor.

FIG. 10 is a table illustrating Method I storage of incoming right and left fields and their display, in accordance with FIG. 1.

FIG. 11 is a table illustrating Method II storage of incoming right and left fields and their display in accordance with FIG. 2.

FIG. 12 is a table illustrating Method III storage of incoming right and left fields and their display in accordance with FIG. 3.

FIG. 13 is a table illustrating signal processing of right and left fields associated with the camera design shown in FIG. 7A.

DESCRIPTION OF THE ILLUSTRATED PREFERRED EMBODIMENT

Referring to FIGS. 5 and 6 we see two configurations for stereoscopic television cameras using moving mirrors to image right and left points of view on sequential odd and even fields. This use of rotating or oscillating mirrors moved in synchronization with the changing fields of the TV signal is well known in the art, but the particular configuration of the cameras shown here has not been disclosed.

The moving mirror 30 in FIG. 5, placed at 45° to lens 31 of TV camera 33, may take the form of a rotating semi-circular disc, or oscillating surface. Front surface mirrors are used. When 30 is withdrawn from the optical path lens 30, on axis, sees the left image. When 30 is interposed in the optical path as shown in the drawing, light rays are diverted to mirror 32 for the second, or right perspective point of view.

By rotating 30 so that the axis of rotation remains perpendicular to the plane of the drawing, convergence can be set. By varying the distance between 30 and 32, interaxial settings can be changed.

A major advantage of the present embodiment shown in FIG. 5 and FIG. 6 is that both designs provide for alteration of interaxial spacing, with reductions to virtually zero distance. This is critically important for proper photography, especially when using wide angle lenses and photographing objects close to the camera. Very large extensions of interaxial are also possible.

Television camera 37 in FIG. 6, like camera 33 in FIG. 5, can be fitted with a mirror device to accomplish stereoscopic photography with the synchronized movement of mirror 36 with respect to fields being scanned. With mirror 36 in place light rays reaching the lens 34 travel a shorter distance than when 36 is moved out of the optical path. When 36 is moved out of the optical path the effective interaxial distance of successive images encoded on each field is increased to that provided by the distance between mirrors 35 and 36. Mirror 35 may be moved further from or closer to mirror 36 effecting a change in interaxial spacing. In addition, either or both mirrors 35 and 36 may be rotated about their centers with the axes of rotation perpendicular to the plane of the drawing so that effective convergence control can be established.

These cameras automatically provide the appropriate right-left sequence of odd-even fields necessary for the transmission of stereoscopic information as set forth in the present disclosure. The camera shown in FIG. 7 is a television camera version of the copending application No. 261,302 now U.S. Pat. No. 4,418,993. It features coordinated zoom lens optics, and variable interaxial setting by mounting both bodies on a rack and pinion device 40 so that the cameras may move along screw 40A by turning knobs 41 and 42. Zoom lenses 38A and 39A are optically calibrated in the manner described in the aforementioned copending application. The cameras 38 and 39 are mounted so that the axes of lenses 38A and 39B are essentially parallel.

In the preferred embodiment of the invention the cameras use charge coupled devices or other compact solid state or semi-conductor imaging devices for imaging because such devices are particularly small and will allow for very low values of interaxial spacing when the photography calls for such spacing. The signals from cameras 38 and 39 provide three-dimensional pairs as follows: the odd fields are reserved for the right camera 39 and the even fields for the left camera 38 (or vice versa depending upon standards which are set). This alternately encoded right-left signal is then fed to the appropriate TV monitor or recorder or transmitted. I will discuss the purpose of delay 43 and switcher 43A below.

It is important to realize that the design of this stereoscopic television camera is in no way limited to use with the right-left alternate interlace system, and that this design may be used in all circumstances where it is necessary to produce a binocular pair of images without regard to the way in which the signal is encoded.

In the copending disclosure No. 6,261,302 I have described in detail the means for calibrating the centration of a matched pair of zoom or prime lenses. Therefore the description given here will be brief but some discussion must take place in order for the teaching to be coherent in the present context.

I have found that spurious parallax can be produced when zoom lenses are used for stereoscopic photography since recentration of the optics takes place as focal length, and also focus, are changed. With reference to FIG. 7B we may see how this comes about. Right objective 44 has a lens axis 45 properly centered on image plane of charged coupled or similar pickup device 46. As the lens 44 is zoomed lens axis 45 moves to its new position 49. Such a translation takes place because of imperfections in the mounting of the individual lens elements and imperfections in the mechanism of the lens mount itself. The same situation exists for left lens 50 and its lens axis 54 which moves to a new position coinciding with 55. Note that all axes are perpendicular to the planes of image forming devices 46 right and 51 left, and note also that this schematic view of the optics and their relation to image forming devices correspond to cameras 39 and 38 of FIG. 7A.

I have defined a new quantity the recentration vector, which for simplicity will be called the centration vector, made up of vertical and horizontal components of recentration. In FIG. 7C, I show a typical plot of these components as a functional relationship of focal length. Typically such plots produce straight lines or linar functions. Note also that the wandering of centration or measurement of the centration vector is generally a millimeter or less. However, such a movement when multiplied by image magnification gives us the quantity screen parallax, which may be fifty to several hundred times this value in typical television displays.

The resultant spurious parallax will have two components, horizontal and vertical. The vertical is far more harmful, for vertical parallax is always undesirable in a stereoscopic imaging system since there is no contribution to stereoscopic effect. Moreover, only eye strain can result from attempts to fuse images which have vertical parallax.

If the vertical and horizontal components of centration are plotted as shown here, as a function of focal length and/or of focus, steps can be taken to correct this change in centration. If a centration vector equal to the magnitude of that plotted but opposite in sign is added to the optical system, then the sum of recentration will be zero, and the lens axis will have no effective recentration, hence no spurious parallax will be produced.

Three means for correction of such recentration were taught in my copending patent application. They are: Recentration controlled by miniscule panning or tilting of one or both of the cameras; Recentration controlled by mounting the lenses in lens boards which provide for lateral movement of the lenses axes so that they remain perpendicular to the plane of the imaging surface; Finally, recentration may be controlled by using fluid filled variable diopter power prisms mounted in front of the lenses, said prisms are continuously variable and may add centration vector components equal to but opposite in direction to plotted recentration to produce effective zero recentration.

All of these techniques may be applied here. In addition, it should be noted that all of these techniques and those taught below may also be applied to setting of convergence.

The preferred embodiments for the television system shown here are different. The cameras are fixed in parallel position. That is, lens axes of the cameras 38 and 39 shown in FIG. 7A remain parallel. Convergence and centration correction are affected by movement of either the imaging device, vacuum tube or preferably CCD, or semi-conductor or similar solid state device with respect to the lens axes, or by electronic translation of the television raster itself.

If movement of the CCD or similar device is to be accomplished, simple mechanical means may be employed to move the device in either the vertical direction 47 and 52, or in the horizontal direction 48 and 53. Such devices are well known to the art and need not be described here. They can be gear or cam controlled, or controlled by various electrical or electronic means such as servo motors or stepper motors. Once the recentration has been plotted as shown in FIG. 7C, and stored in some convenient form, a sensor reads the focus or focal length setting of the lens and then appropriate correction is made to the CCD or similar device by causing it to translate up or down, left or right, whilst remaining perpendicular to the lens axes.

If both cameras are controlled so that the net recentration is zero, then we have the condition I define as absolute recentration correction. However, only one of the cameras needs to be so controlled to follow the recentration of the other camera. If one lens axis follows the exact motion of the other, then the net effect will also be effective zero recentration, and this method I call relative recentration correction.

It should also be noted that convergence may also be set by shifting either or both of the CCD or similar imaging devices in the horizontal direction. The result of such recentration to produce convergence may be observed in the camera viewfinder or on a television monitor. Changes in convergence may also be programmed and held in a memory and microprocessor controlled.

All electrical or electronic means may be provided for recentration correction, since the television raster itself may be shifted vertically or horizontally to produce exactly the same effect as that noted above for such shifts in the CCD or similar device itself. Convergence may also be set through electronic shifts of the image, and the result of such convergence setting may be viewed through the display device which is part of the television camera, or on a monitor screen.

A simple sensor device, such as a gear driven wheel in contact with the lens mount, or a snubber wheel, or a magnetic tape affixed to the lens mount read by a suitable magnetic head, may then convey positional information with regard to the focus and zoom setting. If such positional information has been previously calibrated in terms of the corresponding values of centration vector for focal length or focus distance, and stored in an electronic memory device, then standard data processing techniques may be used to control and translate the television raster in the vertical or horizontal direction in order to correct for recentration effects. Moreover, the cameraman or director may control convergence setting of the stereoscopic television camera by simply setting a horizontal shifting of the raster which may be precalibrated in terms of distance or angle or may be observed directly on a television screen as mentioned above.

The reader will note with reference to FIG. 7A, field store or delay 43 is employed between the cameras and the composite video signal made up of both right and left fields. The purpose of this storage device, which may be a digital or analog device of appropriate design and specifications known in the art, is to record and hold the field produced by left camera 38 so that it may be released after a delay of one field duration. In this way images taken by left and right cameras 38 and 39 respectively may be transmitted sequentially in accordance with the usual practice of the system of television interlace.

It is also possible to use a direct storage type tube for one of the imaging devices of the pair of cameras and in this way eliminate the need for electronic storage.

The important notion to be understood here is that the taking or photographing of right and left fields simultaneously eliminates the defect of spurious temporal parallax noted elsewhere in this disclosure. Images of right and left stereopairs, especially for rapidly moving objects, must be taken simultaneously. One of the images must be stored in order to conform to the requirements of interlace transmission to provide odd and even fields in sequence, pairs of these fields having been taken simultaneously.

It should be pointed out that that choice of associating right field with odd interlace and left with even is arbitrary, and whether storage is accomplished with the right or left field is likewise arbitrary, so long as the sequence operations as set forth here remains consistent with invention's basic principles. Obviously, standards must be set with regard to encoding of left-right with even-odd, or right-left with even-odd.

The cameras must be so adjusted so that while one is producing the odd portion of the interlace, the other must be simultaneously producing the even portion of the interlace. For example, and with reference to the configuration shown in FIG. 7A, while left camera 38 is producing the even portion of the interlace, or the even field, right camera 39 is producing the odd field. Thus the left-even and right-odd fields are produced simultaneously.

Each camera produces only half the number of fields usually produced by television cameras, since each contributes but half the number of lines to the final stereoscopic picture unit, which is made up of the sum of both left and right fields. In the system commercially employed for broadcast in this country, each camera would thus produce thirty fields.

Other variations of interlace are possible, such as 30 fields per second, with half devoted to left and the other half devoted to right images, but all the possible variations need not be noted here, as those well versed in the art may appreciate, without departing from the scope of this disclosure.

I now refer the reader to FIG. 13 which tabulates the sequence of events taking place at the cameras and in field delay 43. $F_{o1}$, or the first right camera odd field is taken at the same moment as $F_{e1}$, or the first left camera even field. The right field is transmitted by the switcher 43A while the left field is held as shown in the table and then transmitted. Thus, a composite video signal made up of $F_{o1}$ and $F_{e1}$, making up one complete stereoscopic picture unit is transmitted. Note that there is a similarity in this system and the operation of a motion picture camera is that there is a pause in picture taking every alternate sixtieth of a second corresponding to the pull-down requirements of film in a camera. However, the pause takes place for an entirely different reason; there must be time for the stored field to be transmitted. The sequence continues as shown in FIG. 13, with the next set of fields, $F_2$ and $F_{e2}$.

Switcher 43A operates in synchronization with cameras 38 and 39 and delay 43 to provide the appropriate pattern of odd-even (right-left) fields.

Turning our attention to FIG. 1, I will now explain how signals produced by the video cameras discussed above, or by similar cameras of other designs, or by computer devices, or by any means whatsoever capable of producing a suitable binocular pair of images, may be displayed on a monitor or receiver of design similar to those presently employed with picture tubes very similar to those of current manufacture.

Antenna 1 receives the transmitted signal which may be through-the-air transmissions. Obviously, cable or closed circuit or videodiscs or tape formats or various other means are also suitable sources for incoming video information. The radio frequency tuner 2 tunes to a particular channel, and the intermediate frequency amplifier 3 boosts the power of the signal so that it may be handled by the video detector 4. From here the signal is separated into alternate fields, where the odd fields are directed to field store A 6, and the even fields are directed to field store B 7. It should be noted that analog means such as image storage tubes, for example of the barrier grid type which are used for standards conversion, or digital devices such as those also used for standards conversion or in image enhancement devices and the like may be used. These storage devices or buffers need only meet the characteristics of the invention as set forth here and in no way do I limit myself to a particular storage technology since the essence of the invention remains the same whatsoever device is specified. For example, in certain applications magnetic disc storage, or other forms of similar spinning disc no matter what media is employed for recording, may find suitable application.

The sync pulses 5 are taken off the video detector 4 as is conventionally done in all TV receivers, in order to tell deflection circuits 12 how to drive the sweep voltage for the picture tube. In my application the deflection circuits will incorporate means for increasing the sweep to a greater value than normally used in order to increase the number of fields seen by each eye so that the number of fields per eye may reach the critical fusion frequency. As shown here in FIG. 1 and in FIG. 10, I am specifying a doubling of the scan rate in order to double the fields perceived by each eye. But this invention is not limited to such a doubling and any value at or above critical fusion frequency requirements will suffice and this particular manifestation employing doubling of rate of scanning in no way limits me to the use of such doubling.

Sync pulses 5 are taken off the video detector 4 and sent to the occluding glasses phase control circuit 11 for updating the phase relationship between the right 15 and left 16 electro-optical elements in the glasses 17. Occluding elements 15 and 16 alternately pass right and left field so the desired image is seen by the desired eye. Power supply 9 also supplies power for occluding glasses charging circuit 10. We will return to the means for interfacing glasses with receiver later in this disclosure.

I now refer to the table given in FIG. 10 showing Method I for treating the incoming fields to double the interlace rate and to present fields in a controlled sequence. I will remind the reader that there are many variations of field store or buffer devices presently available and I in no way limit myself to any specific embodiment. Choice of field store could be made based on cost and characteristics of that which is to be displayed. For example, in the application of video games pixel density is generally lower than in handling video signals of live action subjects. Therefore one type of buffer might be employed in graphic displays like those employed in video games, and another in live action.

FIG. 10 gives the logical sequence of how incoming fields should be handled to obtain the desired results. The field rate is doubled to eliminate flicker but there may be no reduction of spurious temporal parallax. I say this since Method I presents fields in the following sequence: right-right-left-left, to make up complete stereoscopic picture unit. If right-left fields were alternated as will be shown in Methods II and III then any spurious parallax would be better handled since a better mix of right-left picture information will result. In other words, right-left images are presented closer together in time and the sequence of Method II favors further reduction of any spurious temporal effects. However, method I uses one less field store than Method II and two less stores than method III.

In other words, Method II for display promotes reduction of spurious temporal parallax more readily than Method I since it alternates odd-even fields more rapidly, hence the duration between odd-even fields is reduced compared with Method I.

However, for certain applications there may be advantages to using Method I. For slow moving subjects where spurious temporal parallax is not a factor, or in applications where observed spurious temporal parallax is not bothersome to the viewer, Method I may be adequate. Moreover, Method I for display employs only two field storage devices, as opposed to three for Method II, and this simplification in circuitry might lead to cost reductions. In addition, Method I's sequence of presentation of right-left information, odd-odd and even-even achieves elimination of flicker though the means of doubling the interlace in sequence in such a manner that 60 cycle occluding selection devices may be used, since each opening of the shuttering element transmits two fields. Method II presents the right-left information as follows: odd-even-odd-even. Hence the selection device must occlude in exact sequence with each field as it is presented, or at 120 cycles.

Certain electro-optical occluding elements may have difficulties shuttering at that rate, and they or their power supply may be more expensive than those employed in Method I.

It is assumed that in the preferred embodiment the field stores I use have the following characteristics: They can store and hold incoming fields for a full resolution color signal, and that they can playback each stored field twice, without erasure, and at twice the rate at which the incoming field was recorded. Recording of the new field will result in complete erasure of the old field recording.

However, I do not limit myself to such specifications for in certain applications it may be preferable to play back each field more than twice.

In FIG. 10 we see that the first odd field ($F_{o1}$) is stored in frame store A, and that the first even field ($F_{e1}$) is stored in store B. $F_{o1}$ and $F_{e1}$ make up the first picture unit which must be processed into a stereoscopic display unit. Store A cannot release field $F_{o1}$ until such time as it is completely recorded and $F_{e1}$ begins to be recorded by store B. Then it refreshes the CRT twice in the same unit of time that one field was incoming. Now A is ready to receive its fresh field, $F_{o2}$. Whilst this is occurring, B releases its field so that the CRT may be refreshed with two fields of $F_{e1}$. Thus one stereoscopic display unit of odd-odd-even-even, or right-right-left-left is seen by a viewer wearing an active (or passive selection device), with shutters occluding in synchronization with the refresh rate (or handedness of the display signal). (Passive glasses may also be used if polarization characteristics of the image are changed at the screen by means of electro-optical elements).

I now turn my attention to Method II illustrated diagrammatically in FIG. 2 and in the table presented in FIG. 11. The method is similar to Method I, with three rather than two field stores used.

After leaving the video detector fields are stored in buffers A 6, B 7, and C 18, as shown in FIG. 11. This method allows for the preferred sequence of display, right-left-right-left, which will be discussed below.

It should be pointed out that the active occluding glasses shown here in FIG. 2 and FIGS. 1 and 3 may be replaced with passive glasses if sequential polarization takes place at the plane of the imaging device as shown in FIG. 4. In addition, no restriction is placed on the type of display device employed. Although a cathode ray picture tube has been specified in the drawings, since this is the presently dominant technology employed, it will be clear to the reader that the basic display scheme employing image storage in conjunction with sequential display of fields is in no way limited to CRT technology, and might just as well be used in conjunction with any one of a number of various display technologies such as liquid crystal, light emitting diode, plasma display panels, or various other modern display techniques.

FIG. 11 provides in tabular form a of the sequence of events occurring in the handling of incoming fields and their treatment so as to provide an output of one suitable stereoscopic display unit free of flicker and temporal parallax defects. After the first odd field $F_{o1}$ is received by the TV set and processed by the video detector it is routed to store A and held. Since I choose to use the interleaved right-left-right-left display mode in this method, in order to fully eliminate spurious temporal parallax effects, the first even incoming field $F_{e1}$ has been recorded by store B. Once this occurs store A may playback $F_{o1}$ at twice its incoming rate. Now that $F_{e1}$ has been fully recorded in store B it may be played back at twice its incoming rate. Since fields are at this moment still actively in use in stores A and B we must resort to another field store C to record the incoming second odd field, $F_{o2}$.

Once $F_{e1}$ has been played back, the playback sequence of $F_{o1}$ and $F_{e1}$ must be repeated for the completion of a stereoscopic display unit. As may be learned from the table, the sequence is repeated indefinitely in the manner prescribed by using three frame stores.

Thus incoming odd and even (right and left) fields are stored and played back by means of buffers A, B, and C at twice the incoming rate. The sequence in which the fields are displayed is preserved but the odd-even sequence is repeated twice and at twice the rate. Since right image follows left image immediately in this method, in contradistinction to Method I, where right-right-left-left is used, there is less time interval between the display of similar right and left images. This promotes elimination of spurious temporal parallax more effectively than with Method I where twice the time is needed before alternate eyed fields are displayed.

Method III is represented diagrammatically by FIG. 3 and the sequence tabulated in FIG. 12. In this manifestation of the invention so-called compatibly encoded stereoscopic signals are broadcast, for example, by means of the teachings of U.S. Pat. Nos. 3,674,921 (Goldsmith) and 3,896,487 (Tesler). Both methods sum the right and left video signals which are derived simultaneously by video cameras or whatever source. To simplify the ensuing discussion I will refer specifically to Goldsmith's embodiment. Here a single signal representing one of the viewpoints is transmitted along with a high frequency difference signal between the right and left developed video signals. The receiver reconstructs the missing half of the stereoscopic signal from the single signal representing a single point of view and the high frequency difference signal. Then Goldsmith teaches that both right and left images are displayed by the CRT as an interdigitized parallax stereogram, with parallel strips of right-left picture in close juxtaposition with appropriate lenticular elements so as to achieve an autostereoscopic representation.

For reasons which have been given earlier in this disclosure, I am of the opinion that such a display scheme has little merit. To recapitulate, the disadvantages are: A new type of CRT must be created to display such information, and such an interdigitized parallax stereogram suffers from limited viewing zones and frequent zones of pseudoscopic effect.

Moreover, both Goldsmith and Tesler's embodiments use hitherto unused portions of the waveform to encode the stereoscopic information, or use novel signal processing which possibly may not be successfully recorded with conventional unmodified video discs and tape recorders. The later difficulties aside, in my view the difficulties entailed in replacing existing CRT designs with a new design, which may or may not be capable of displaying existing planar transmissions, is of dubious merit. Accordingly I suggest that such so-called compatible simultaneously encoded stereoscopic video signals be displayed sequentially on conventional CRT's or other display devices, in accordance with the teachings of this disclosure.

Referring to FIG. 3, we see such a compatible signal arriving at antenna 1, thence to RF tuner 2, and IF amplifier 3, and video detector-3-D decoder 4A, where the left and right pictures are segregated, these left and right pictures made up of two fields for each picture, which are then stored in the following manner: the left image composed of odd and even fields to stores A 6 and B 7 and the right image composed of odd and even fields to stores C 18 and D 19.

How these fields are treated by storage devices and released in the appropriate sequence will be discussed shortly with the aid of FIG. 12. These fields are then handled by the video amplifier 8 and imposed on the CRT as set forth below to achieve double the usual refresh rate.

FIG. 12 shows that the left in field, which would have been decoded by the receiver shown in FIG. 3, is in two components: odd field left ($F_{o1}$) and even field left ($F_{e1}$). These fields are stored in buffers A and B.

As this occurs, the right in column shows that odd field right ($F_{or}$) and even field right ($F_{er}$) are being recoded by buffers C and D respectively. Since the left and right odd fields are being stored at the same time, while the left and right even fields are being stored, these left and right odd fields may be played back as $F_{o1a}$ and $F_{orc}$. The last letter in the subscript refers to the field store used. Next the even fields may be played back as shown in FIG. 12 in the out column so that we achieve one complete stereoscopic display unit made up of $F_{o1a} + F_{orc} + F_{e1b} + F_{erd}$. As shown in the table the sequence continues indefinitely so that all incoming fields are treated as described for the first set of fields making up the first stereoscopic picture unit.

Electro-optical occluding shuttered spectacles 15 have their shuttering elements 15 and 16 synchronized with the display of the left and right fields so that the viewer may observe the appropriate image with the correct eye.

Electro-optical shuttering spectacles, as shown here, use surface mode liquid crystals manufactured by American Liquid Xtal Chemical Corp. of Kent, Ohio. By specifying this product I do not limit myself to employing only this particular embodiment of such shutter devices, but no electro-optical material heretofore has shown such desirable characteristics in the context of stereoscopic television display. Shutter time is extremely rapid, the shutters are more transmittant compared with other embodiments of the art, namely bulk mode LCD's or PLZT devices, and power requirements are low.

Prior art limits itself to synchronization information transmitted to the glasses by cable or such information could be conveyed using any one of a number of wireless means using electromagnetic radiation or sound waves well known in the art and exemplified in one embodiment taught by U.S. Pat. No. 4,214,267 (Roese). Moreover, such occluding spectacles may also achieve appropriate synchronization information from built-in quartz crystal control oscillators or a similar accurate internal clock as shown in FIG. 8, in my preferred embodiment.

Spectacles 15 use surface mode liquid crystal material for lenses 16 and 17 which are powered by rechargeable cells 57 depicted here in temple 56. Synchronization of electro-optical occluders 16 and 17 is determined by shutter synchronizing circuit 62 depicted here in temple 63. Clock circuit 62 employs quartz crystal oscillators or similar time control components to achieve proper occlusion action of 16 and 17. The spectacles when not in use are stored on the receiver or monitor or in a compartment within the receiver or monitor or in a cabinet associated with the receiver or monitor by electronic connection. Cells 57 are recharged via internal wires 58 via jack 59 which is hooked up to charging circuit 10.

The shutter synchronizing circuit would drift out of phase with the television fields after a period of time depending upon the accuracy and stability of control elements used in its construction. Given the present state of the art, or the probable state of the art for the near future, updated phase information would be needed to guarantee shuttering accuracy with respect to the display of odd-even fields. Therefore it is necessary to remind circuit 62, or to update it with respect to the field rate of the TV monitor or receiver via phase control circuit 11, which receives sync pulses from the video detector 4. The monitor or receivers shown in FIGS. 1, 2 and 3 would employ a similar quartz clock or other time control component which would control the field rate and this would in turn give information about its synchronization status via phase control circuit 11 through jack 60 via wires embedded in the spectacles to the phase control circuit 61 in temple 63.

Thus the spectacles or selection device depicted in FIG. 8 would have its shutter control or synchronization circuit 62 put in phase with the phase control circuit 11, each time it was recharged. In this way all cables or wireless means for communicating synchronization information to active selection devices would be eliminated.

The means described above, for synchronization of selection devices shuttering elements with respect to displayed fields using an internal clock with in each pair of glasses will work well if the television transmission system is quartz crystal controlled or controlled by means of a similar clock system. This is possible to put into practice without any great effort or expense in the context of closed circuit applications. However, broadcast television signals do not have their field rate locked down accurately as is well known to practitioners of the art, and selection devices with included clock circuitry would soon tend to drift out of synchronization with the transmitted fields.

Therefore I suggest the use of infra-red radiation as a source of information to keep glasses and fields in phase. The means for broadcasting and detecting such infrared radiation for synchronization or other information purposes is well known and will not be described here in any detail. A source of infra-red 65 is powered by the TV receiver 64 power supply and synchronized with the fields by means of the deflection circuits. Thus an on-off or digital signal can be radiated by this infra-red source 65 which is a part of the TV receiver and directed to be seen by an infrared sensor 66 which is part of the occluding spectacles 67. Thus, when the spectacles "see" the flickering pattern transmitted by the receiver, they will keep in phase with the source and hence the TV deflection circuits.

There may be circumstances in which glasses may need to have both internal clock circuitry and an infra-red detection system for maintaining synchronization. In such a case the infra-red signal would serve to update the clock circuit with respect to the synchronization or phase status of the displayed fields.

So far I have discussed the use of the technology revealed here in the context of a stereoscopic imaging system. However, there is another use to which this technology may be put. In certain applications it may be desirable to encode a single TV channel with two or more individual programs. In certain circumstances it may be necessary to display more than a single program onto a single display surface. In this case it would be possible to encode the various programs, for example program A and program B, just as right and left signals have been encoded alternately on odd and even fields.

Thus one viewer wearing a pair of A (odd field) synchronized spectacles, in which both left and right shuttering elements occluded not alternately but rather in perfect synchronization with program A (odd field). A second viewer would then wear a pair of B synchronized (even field) spectacles in order to see only program B.

If a 120 Hz receiver is used then it would be possible to transmit three 40 Hz programs by means similar to those described above.

Referring now to FIG. 4, I show a means whereby passive glasses without electro-optical shutters but rather employing sheet polarizers may be used. In order to achieve this embodiment, similar in many ways to the teachings of U.S. Pat. No. 3,858,001 (Bonne), glasses 22 with sheet polarizers 23 and 24 are used for viewing the television receiver or monitor employing a CRT or other display device. Left 23 and right 24 sheet polarizers axes are orthogonal. Synchronizer 29 controls the activity of the surface mode liquid crystal screen, 25 with respect to the display of odd-even fields on the display device depicted here, CRT 27. However, the embodiment shown is not limited to CRT devices and other types of display technology would serve equally well. Sheet polarizer 26 is interspersed between surface mode liquid crystal plate 25 and CRT 27. Thus the light emitted by the display device is synchronized in terms of its polarization axes field by field so that the appropriate field is occluded or transmitted by spectacles 22 for a stereoscopic effect. Whereas Bonne specifies PLZT material in his disclosure, I specify surface mode liquid crystal material since, unlike PLZT material, it may be fabricated in the sizes large enough to cover an entire viewing screen. To build this embodiment using PLZT ceramics would require a matrix or honey comb of PLZT material, in other words many elements, to provide coverage of a display screen of useful size. However, the use of surface mode liquid crystal material would be far simpler and less costly and more attractive to the eye.

Nevertheless, advances in electro-optical shuttering devices are expected and new materials superior to those now in use will come about and I do not wish to limit myself to any specific material since the scope of this invention is not bound by specific choices of electro-optical materials as may be readily understood by studying the teaching set forth in this disclosure. Indeed, shutters using electrophoretic, electrochromic, discotic LCD, magnetic particle, or other technologies are also feasible.

Moreover, certain modulators such as dynamic scattering liquid crystals, photoelastic and electrochromics which have too slow a response time to serve as switches for video can be formed into multiple layered sandwiches. By driving each layer at a slightly different rate, any desired switching rate may be obtained due to the beat frequency which will be established.

What I claim is:

1. An apparatus for taking and sending stereoscopic television pictures comprising: first and second television cameras spaced a predetermined distance apart for taking at least first and second respective and simultaneous video fields of the same scene, a delay circuit for accumulating at least a video field from one of said cameras; and means for sequentially transmitting the undelayed and delayed video fields such that at any given time only a single video field from a single video camera is transmitted.

2. Apparatus for stereoscopic video display comprising:
   means, responsive to an incoming video signal of alternating left and right video fields representing the same scene at the same time but from spaced-apart left and right views, and for alternately displaying, in sequence, two identical left scene video fields followed by, in sequence, two identical right scene video fields on said video display with each field being presented at twice the normal field rate;
   means for blocking the view of the observer's left eye when a right scene field is displayed; and
   means for blocking the view of the observer's right eye when a left scene field is displayed.

3. Apparatus as in claim 2 wherein said displaying means includes means for interlacing the left and right video fields being displayed.

4. Apparatus for stereoscopic video display comprising:
   a raster scan video display device;
   means, responsive to an incoming video signal of alternating left and right video fields of the same scene generated simultaneously from spaced-apart left and right television cameras, and for displaying, in sequence, at least two identical left and, in sequence, at least two identical right video fields on said display device at a rate of at least twice that received from said television cameras;
   means for blocking the left eye when a video field from the right television camera is displayed; and
   means for blocking the right eye when a video field from the left television camera is displayed.

5. Apparatus as in claim 4 wherein said displaying means provides for interlacing of left and right video fields.

6. In a system for stereoscopic video display wherein video signals are received from a source providing video fields from left and right spaced apart views of the same scene and having means for storing individual video fields, wherein the improvement comprises: means for alternately displaying, in sequence, at least two identical left video fields followed by, in sequence, at least two identical right video fields, each field being displayed at twice the field rate of incoming video signals from the source.

7. The system of claim 6 wherein said displaying means displays interlaces left and right video fields.

8. In an apparatus for taking and sending stereoscopic television pictures having spaced apart left and right television cameras, wherein the improvement comprises:
   means for providing centration of the right and left cameras to prevent spurious parallax comprising electronic means for aligning the respective left and right images so that they are vertically aligned with each other; and wherein said centration providing means comprises means for vertically shifting the television raster of at least one of the television cameras.

9. In an apparatus for taking and sending stereoscopic television pictures having spaced apart left and right television cameras, wherein the improvement comprises:
   means for providing centration of the right and left cameras to prevent spurious parallax comprising electronic means for aligning the respective left and right images so that they are vertically aligned with each other; and wherein said centration providing means comprises means for electronically shifting the image of at least one of the television cameras in a vertical direction.

* * * * *